United States Patent [19]

Klukowski et al.

[11] Patent Number: 4,608,862
[45] Date of Patent: Sep. 2, 1986

[54] SPLINE CHECKING FIXTURE

[75] Inventors: Chester Klukowski, St. Clair Shores; Richard Lysic, Fraser, both of Mich.

[73] Assignee: Flint & Walling, Inc., Warren, Mich.

[21] Appl. No.: 692,949

[22] Filed: Jan. 18, 1985

[51] Int. Cl.⁴ .......................................... G01M 13/02
[52] U.S. Cl. .................................. 73/162; 33/179.5 R
[58] Field of Search ..................... 73/162; 33/179.5 R

[56] References Cited

U.S. PATENT DOCUMENTS

| 3,507,049 | 4/1970 | Heldt | 73/162 |
| 3,668,783 | 6/1972 | Riddell | 33/179.5 R |
| 3,732,626 | 5/1973 | Miller | 33/179.5 R |

FOREIGN PATENT DOCUMENTS 601612  8/1934  Fed. Rep. of Germany ........ 73/162

Primary Examiner—Charles Frankfort
Assistant Examiner—Denis Corr
Attorney, Agent, or Firm—Cullen, Sloman, Cantor, Grauer, Scott & Rutherford

[57] ABSTRACT

Checking fixtures for determining the effective tooth spacing along the pitch circle diameter of splined or gear-like members having exterior or interior teeth. Each checking fixture has two sets of L-shaped teeth which interfit in a first position for loading the member to be checked and are separable to a second position for checking the effective tooth spacing along the pitch circle diameter and providing a direct reading of the size of each part checked through a readout device. A wear compensator supports and axially adjusts the position of the member to be checked along the axial length of the partial teeth to prevent localized wear on the partial teeth.

7 Claims, 8 Drawing Figures

SPLINE CHECKING FIXTURE

BACKGROUND OF THE INVENTION

The following invention relates to fixtures for checking effective tooth spacing along the pitch circle diameter of a splined or gear-like member having exterior or interior teeth.

As with all mass produced products, gears and other toothed parts must be checked to determine whether the production process has produced the results that were desired. Such inspection is somewhat difficult in the case of gears because of their irregular shape and the number of factors that must be checked. Among the factors that must be checked is the accuracy of tooth dimensions; such as, lead, profile thickness, spacing, and depth. Tooth spacing must be uniform and correct within very strict tolerances. As an example, a splined clutch plate for use in an automatic transmission must have a tolerance of 0.002 at a pitch diameter of approximately six inches on a clutch plate which is approximately 0.050 inches thick. To insure correct tolerances, a checking device must be used that is extremely accurate.

A common way for checking the thickness of gear-teeth along the pitch circle diameter is by using a gear-teeth vernier caliper. A vernier caliper generally has two members which are connected in a generally "F" shaped formation with one of the members being moveable with respect to the other. To check the tooth thickness at the pitch circle the members are adjusted until they both contact the sides of the gear tooth; then the distance between the two members can be measured and the thickness of the tooth determined.

A problem with this type of gear checking device is the inability to check the effective tooth spacing which takes into consideration the cumulative error in size and spacing of all teeth at the pitch circle diameter.

In U.S. Pat. No. 2,561,533 issued to J. J. Parker on July 24, 1951, adjustable tooth gauges are disclosed which permit teeth on diametrically opposite sides to be checked. The adjustable tooth gauges of Parker are used to check gears having internal teeth or external teeth. Both types of gauges are similarly constructed, having two complementary ring-like body portions disposed in face to face relationship and angularly adjustable relative to each other about their common central axis. Each body member is provided with a complementary portion of each gauging tooth around the full pitch circle. When the body portions are rotatably indexed relative to each other, the paired segments of each tooth are moved toward or away from each other along the pitch circle to determine the overall effective width of a master gauging tooth, or gauging tooth of known size. A disadvantage of the Parker adjustable tooth gauge is that it did not provide any data on the effective size of each individual part checked. Parker's concept required setting the gage to a pre-determined tooth thickness and then using it as a functional "go" or "no go" check. Due to the accuracy required in checking gears and splines, if the partial teeth are worn or damaged in any way a false gauging will be obtained, rendering the gauge inaccurate.

Another prior art device was an actuating spline gage wherein each tooth portion of the gage comprised three axially stacked segments, the outer two being stationary (to stabilize the unit against misalignment) and the central one being indexable. With such three-piece construction, all three portions of each tooth had to contact the tooth of the part being inspected, thereby placing a practical limit on the thinness of the parts which could be inspected.

BRIEF SUMMARY OF THE INVENTION

The present invention overcomes the above disadvantages by providing two improved gear checking fixtures. One is in the form of a chuck for checking the tooth spacing along the pitch circle diameter of a splined or gear-like member having exterior teeth. The second is in the form of an arbor for checking the tooth spacing along the pitch circle diameter of a spline or similar gear-like member having interior teeth.

In both forms of the invention, each tooth of the checking fixture is defined by two complementary L-shaped segments connected to rings which are indexable relative to each other to vary the width across the paired segments. In a loading position, the segments abut each other, so that the width (i.e., the distance along the pitch diameter) is at a minimum. In this condition, the short leg of each L-shaped portion protects the measuring face (i.e., the longer leg) from impact and wear during loading of the part to be checked.

After loading is accomplished, a cam indexes one tooth segment mounting ring relative to the other, increasing the width across each tooth segment pair, until the edges of the teeth of the part to be checked are engaged. The amount of movement of the teeth is detected by a probe which is connected to an analyzing means, such as a microcomputer, which indicates the distance between the teeth along the pitch diameter. Because each tooth is split along a line parallel with the gear or spline axis, the axial length of the gage or fixture tooth can exceed that of the part being tested, thereby eliminating the previously existing practical limit on part thinness which could be measured. The exact tooth thickness or space width is provided for each part checked, providing for the first time, a means of gathering data on thin parts (0.060 thick or less) for the purpose of statistical process control.

A further advantage of the checking fixtures is the use of a wear compensator. When large numbers of thin parts are tested, the teeth of the fixture inevitably wear. A wear compensator is provided that controls the point at which the part to be tested engages the teeth of the checking fixture.

By use of a master gear, any wear of the partial teeth can be detected. When unacceptable wear is detected, the wear compensator is axially adjusted and the part to be measured is supported at a fresh, unworn point along the axial length of the partial tooth. In this way, the useful life of the checking fixture is extended, by protecting a portion of the gauging surfaces from wear until needed.

BRIEF DESCRIPTION OF THE DRAWINGS

FIG. 1A is an enlarged fragmentary view of a typical pair of partial teeth, shown in the loading position.

FIG. 1B is a view similar to FIG. 1A, showing the checking position of the teeth.

DETAILED DESCRIPTION OF THE INVENTION

Figure 1:
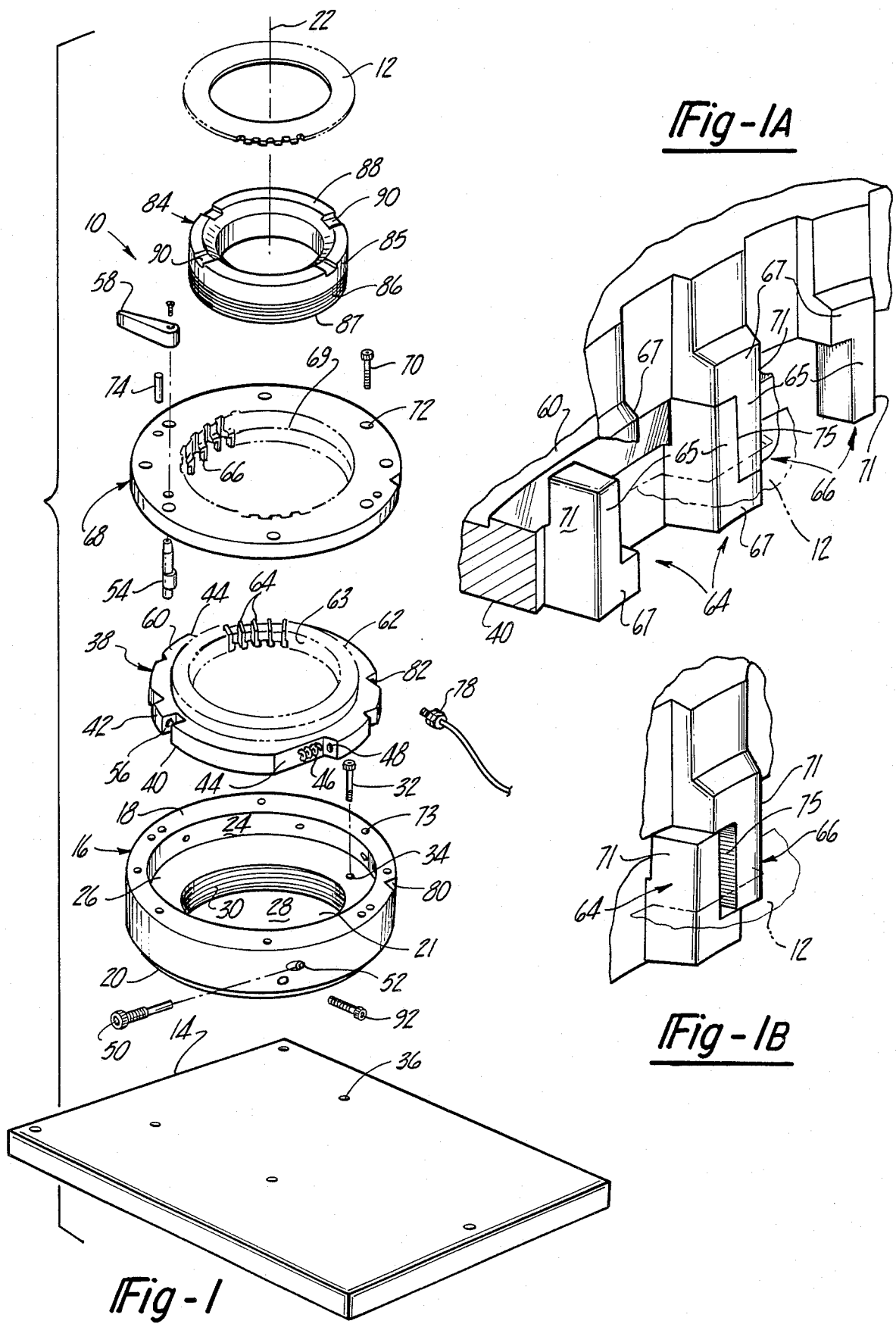
FIG. 1 is an exploded view of the chuck form of checking fixture

With reference to FIG. 1, a first checking fixture or chuck, shown generally at 10, is used for checking a splined or gear-like member 12 having exterior gear teeth. The checking fixture may be supported upon a support plate 14 if desired.

A cylindrical base member 16 has a top surface 18 and a bottom surface 20. A cylindrical opening 21 coaxial with a vertical center line 22 is defined by a vertical wall 24 radially spaced from the vertical center line 22 and a flat circular floor 26. A threaded bore 30 extends from the flat circular floor 26 to the bottom surface 20 of the cylindrical base member 16.

If a support plate 14 is used, fastening means 32, such as Allen head bolts, may be used to fasten the base member 16 to the support surface 14. The fastening means 32 extend through counter-sunk holes 34 in floor 26 into internally threaded holes 36.

An annular indexing plate 38 is fitted into and is rotatable within the cylindrical opening 21. Plate 38 has a bottom surface 40 that is contact with floor 26 and a peripheral side surface 42 that contacts and slides along the vertical wall 24. First notches 44 are provided on opposite sides of the side surface 42 of the plate 38 for receipt of biasing means 46 and biasing guide means 50. The biasing means 46 bias the annular indexing plate 38 in a counter clockwise direction with respect to the vertical axis 22. The guide means 50 are threaded into angled counter sunk openings 52 in opposite sides of base member 16 and guide the biasing means 46 and provide a way to adjust the compression of the biasing means. Guide means 50 is received in a clearance hole 48 in plate 38.

A second notch 56 is provided in the annular indexing plate 38 for receipt of a cam 54. By use of a handle 58 attached to the top of the cam 54 the indexing plate can be rotated clockwise against the resistance of the biasing means 46.

Attached to the top surface 60 of the annular indexing plate is a first cylindrical member 62 having a bore 63 coaxial with vertical axis 22. A first plurality of L-shaped partial teeth 64 extend radially inward into bore 63 in a direction perpendicular to the vertical axis 22. Partial teeth 64 interfit with and overlap a second plurality of inverted L-shaped partial teeth 66 extending radially inward into bore 69 in a second cylindrical member 68.

As best seen in enlarged FIG. 1A and 1B, each of partial teeth 64 and 66 has two parts, a longitudinal part 65 extending parallel to the vertical axis 22 and a transverse part 67, both parts being in the same plane parallel to the vertical axis 22. Each partial tooth has a gauging face 71 and rear face 75.

In a first or loading position, shown in FIG. 1A, the rear faces 75 of each partial tooth are in abutting contact and the transverse parts 67 cover the ends of the longitudinal parts 65 of the opposing partial teeth. This forms a continuous uniform tooth of substantially rectangular configuration. In a second or checking position, shown in FIG. 1B, partial teeth 64 are rotated about the vertical axis 22 until gauging faces 71 of both sets of partial teeth 64 and 66 contact the edges of the teeth of the splined member 12.

The second cylindrical member 68 covers the annular indexing plate 38 and the first cylindrical member 62 and is fastened to the top surface of the cylindrical base member 16 by fastening means 70. The fastening means 70 are inserted into counter sunk openings 72 in the top surface of the member 68 and are threaded into internally threaded openings 73 in the top surface 18 of the base member 16. Dowel pins 74 may be used in aligning the member 68 with the cylindrical base member 16.

A probe 78, which detects movement of the annular indexing plate 38 as it is rotated about the vertical axis 22 by the cam 54, is received by an opening 80 in the side of the cylindrical base member 16 and is positioned in a notch 82 in the annular indexing plate 38.

A cylindrically shaped wear compensator 84 having a top surface 88, a bottom surface 87 and a peripheral face 85 having external threads 86 adjacent the bottom surface 87, is threadably received by the threaded interior wall 30 of base member 16. The top surface 88 of the wear compensator 84 provides a surface to support the splined member 12 when it is being checked. The top surface 88 has notches 90 for receipt of a spanner wrench to adjust the axial position of wear compensator 84 by means of its threaded connection with base member 16. A set screw 92 is also provided to retain the wear compensator 84 in position.

In operation, the checking fixture 10 is initially biased by the means 46 to the first position or load position shown in FIG. 1A. In the load position the rear faces 75 of each partial tooth are in abutting contact and the transverse parts 67 are covering the ends of longitudinal parts 65 of the opposing partial teeth. This forms a continuous tooth body to reduce the chance of damage or wear to gauging faces 71 during loading and unloading of parts to be checked. This configuration also stabilizes the alignment of the gauging faces 71. A splined member 12 having exterior teeth is then inserted into the bores 69 and 63 adjacent the partial teeth 64 and 66.

The cam 54 is then turned to rotate the annular indexing plate 38 clockwise about the vertical axis 22, thereby separating the L-shaped partial teeth 64 from the inverted L-shaped partial teeth 66 until the gauging faces 71 of each of the partial teeth contact the edges of the teeth to be checked. The amount of rotational movement is sensed by the probe 78 and relayed to an analyzing means or microcomputer (not shown) which indicates the width of the teeth along the pitch circle diameter of the spline or gear-like member.

Figure 3:
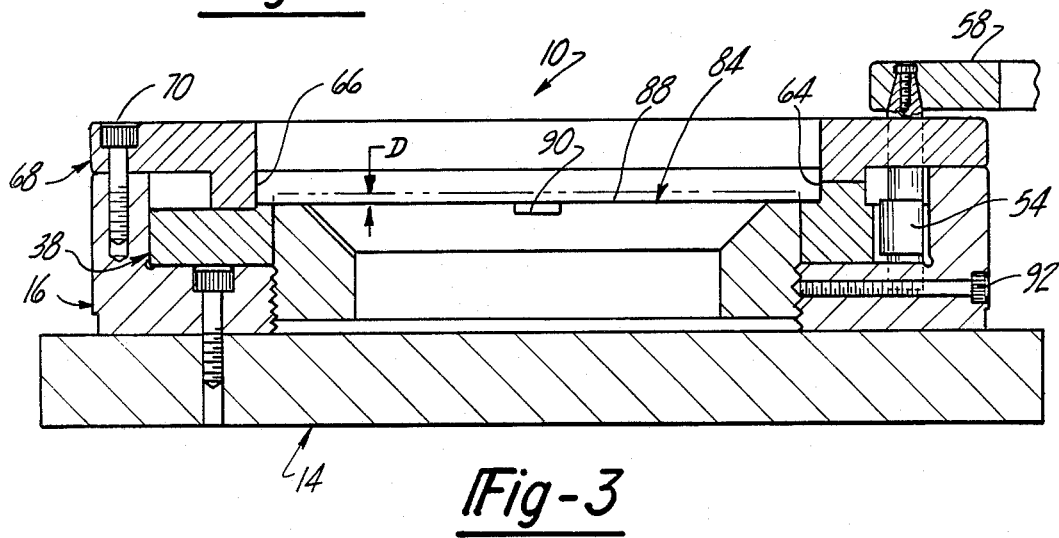
FIG. 3 is a cross-sectional view taken along line 3—3 of FIG. 2.

In order to determine whether the gauging faces 71 of the partial teeth have become worn and are resulting in incorrect readings, a master spline is used to determine if the checking fixture is accurate. The master spline has the proper tooth width along the pitch circle diameter. To check the checking fixture the same process is performed on the master spline or gear-like member. If wear is producing incorrect readings, then the wear compensator 84 is adjusted axially upwardly or downwardly within the range of dimension "D" (see FIG. 3) by threading it into or out of the threaded bore 28. This adjustment permits the member being checked to contact the partial teeth at a different axial position along the gauging face 71. As will be seen from the drawings, the axial length of partial teeth 64 and 66 is much greater than the axial thickness of member 12 to be measured. Therefore, initial use of the checking fixture can involve only the upper portion of the teeth, with wear compensator 84 being lowered to expose fresh, unworn portions of the teeth as wear is experienced.

Figure 4:
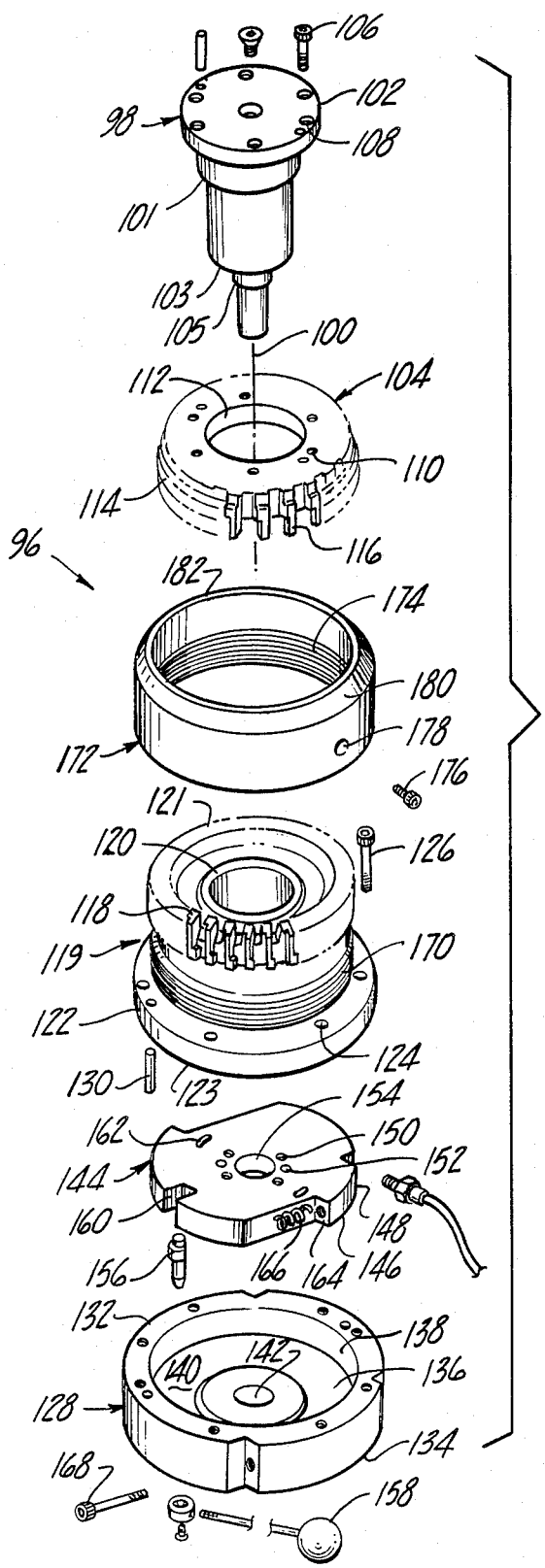
FIG. 4 is an exploded view of the arbor form of checking fixture.
Figure 5:
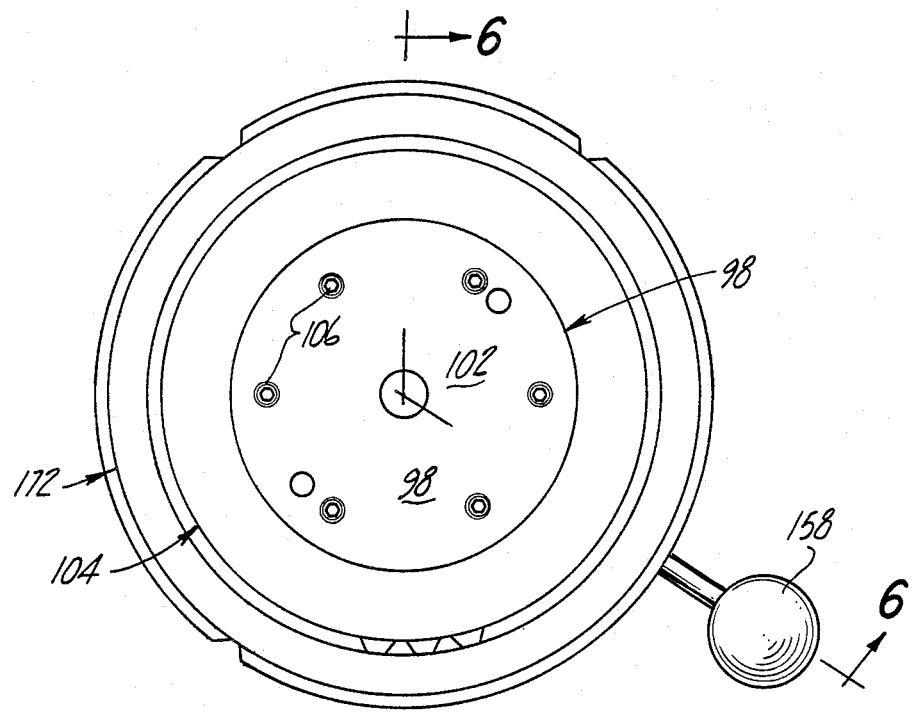
FIG. 5 is a plan view of the checking fixture of FIG. 4.

Referring now to FIG. 4 a second checking fixture or arbor is illustrated generally at 96 for checking a splined or gear-like member having internal teeth. The arbor 96 has a central shaft 98 with a vertical axis 100. The central shaft 98 has a flat upper disc or cap 102 and a stepped decreasing diameter that forms three downwardly facing annular surfaces 101, 103, and 105, respectively, from the cap 102 downward.

A first cylindrical member 104 is fixedly attached to the flat upper cap 102 by fastening means 106 that are inserted into counter sunk openings 108 and threaded into internally threaded openings 110 in the top surface 109 of member 104.

Figure 2:
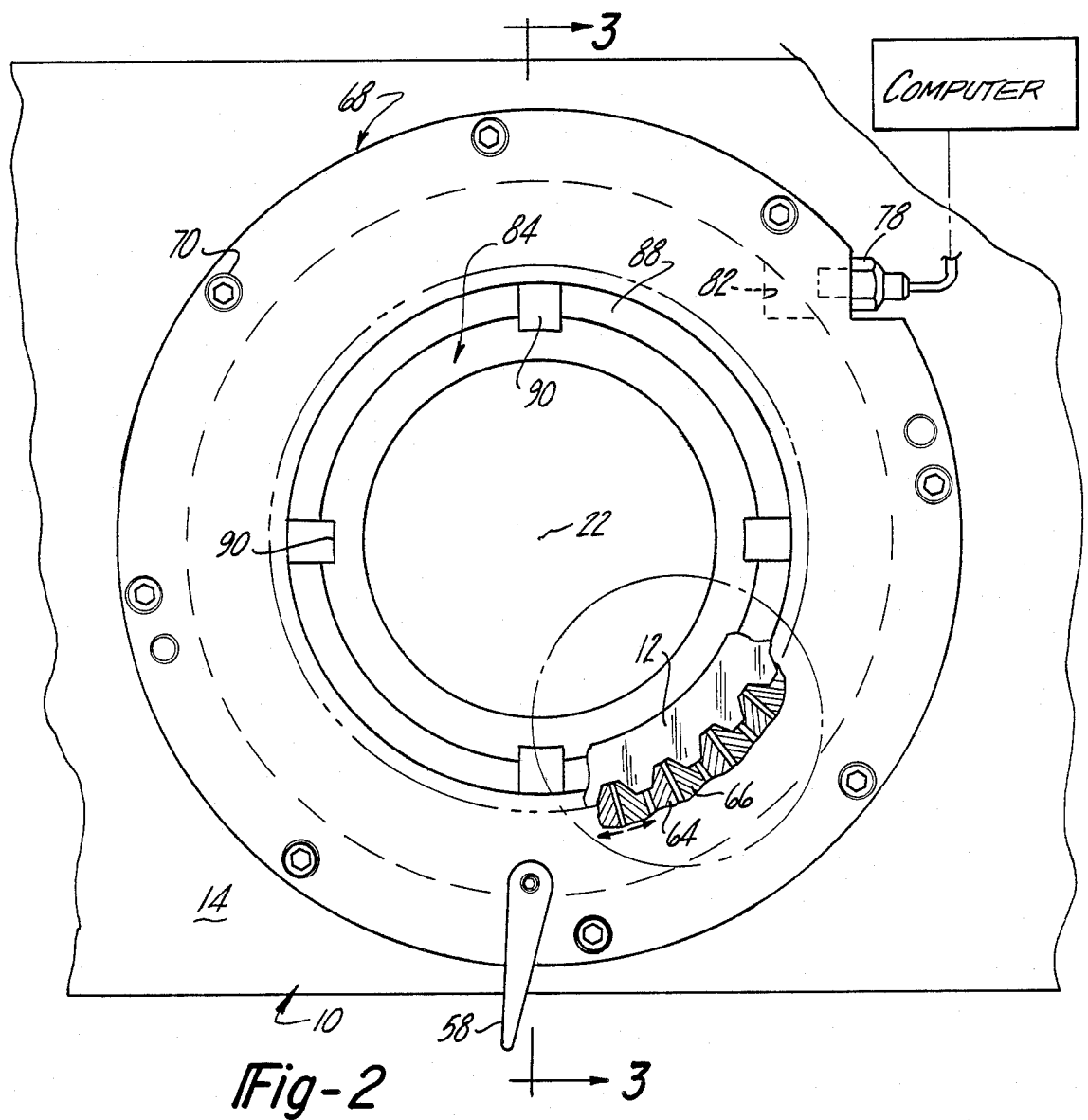
FIG. 2 is a plan view of the checking fixture of FIG. 1, with a partially cut away enlarged view of the splined or gear-like member interacting with the teeth of the fixture.

The first cylindrical member 104 has a bore 112 extending from its top surface through its bottom surface 111 and a peripheral side face 114. Extending from the peripheral side face 114 is a first plurality of upper partial teeth 116 that interfit with a plurality of lower partial teeth 118 on a second cylindrical member 119. The upper and lower partial teeth 116 and 118 are identical to the teeth previously discussed in the first checking fixture or chuck of FIGS. 1-3. The second cylindrical member 119 has a bore 120 extending from its top surface 121 through its bottom surface 123. A radial flange 122 extends from member 119.

The flange 122 has counter sunk holes 124 for receipt of fastening means 126 to fasten the second cylindrical member 119 to a base member 128. Dowel pins 130 may be used to align members 119 and 128.

The base member 128 has a top surface 132 to which the flange 122 is attached and a bottom surface 134. The top surface 132 has a cylindrical opening 136 extending from the top surface 132 to flat circular floor 140, forming a vertical wall 138. A bore 142 extends from the floor 140 to the bottom surface 134.

Figure 6:
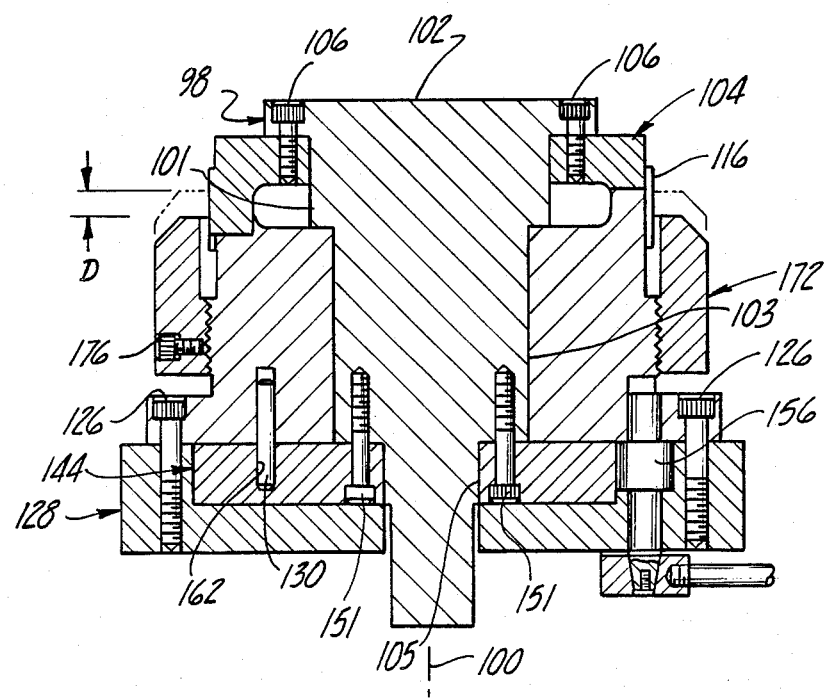
FIG. 6 is cross-sectional view taken along line 6—6 of FIG. 5.

An annular indexing plate 144 is received by the cylindrical opening 136. Plate 144 has a bottom surface 146 which rests upon floor 140 and a peripheral side surface 148 that slides along the vertical wall 138. Plate 144 is rotatable about the vertical axis 100 by a cam 156, which is received in a notch 160 formed in the side peripheral surface 148, and which is actuated by handle 158. Plate 144 is attached by screws 151 which extend through openings 150 into threaded holes in central shaft 98 at surface 103 (see FIG. 6). Dowel holes 152 are for the receipt of dowel pins to aid in the alignment of the annular indexing plate 144 onto the surface 103.

Oblong slots 162 are provided in the annular indexing plate 144 for the receipt of pins attached to the bottom surface 123 of the second cylindrical member 119 to limit rotational movement of the indexing plate 144 relative to member 119.

Second notches 164 are provided in the peripheral side surface 148 for the receipt of biasing means 166 which are held in place by guide screws 168 which guide and adjust the compression of the biasing means 166. The biasing means bias the indexing plate 144 counter clockwise.

A wear compensator 172 having the same function as the wear compensator 84 of the first checking fixture or chuck is provided. The wear compensator 172 has internal threads 174 and a set screw 176 receiveable in an angled hole 178. The top surface 180 of the wear compensator is bevelled to a flat surface 182 that supports the splined or gear-like member when it is to be checked. The internal threads 174 threadably receive external threads 170 on second cylindrical member 119, to permit axial adjustment of the position of top surface 180 as wear occurs.

As will be understood by those skilled in the art, the operation of the second checking fixture or arbor is identical to that of the first checking fixture except that the splined or gear-like member is placed over the checking fixture instead of into bores within the checking fixture.

It will be apparent to those skilled in the art that the foregoing disclosure is explanatory in nature rather than limiting, the invention being limited only by the appended claims.

What is claimed is:

1. A checking fixture for use in checking the tooth spacing along the pitch circle diameter of a splined or gear-like member having exterior teeth, comprising:

a first cylindrical member having a vertical axis, a top surface, a bottom surface, a coaxial first bore extending between said top and bottom surfaces, and a first plurality of partial teeth projecting radially into said first bore;

a second cylindrical member having a top surface, a bottom surface, a second bore coaxial with said vertical axis extending between said top and bottom surfaces, and a second plurality of partial teeth projecting radially into said second bore;

each of said partial teeth being generally L-shaped when viewed in a direction which is radial relative to said vertical axis; and each of said partial teeth of said first plurality of partial teeth being the complement of one of said partial teeth of said second plurality of partial teeth, in a first position of said first and second cylindrical members said complementary partial teeth interfitting in nested inverted pairs to form substantially continuous uniform teeth, whereby a toothed member to be checked is insertable into said bores adjacent said interfitting partial teeth, with said interfitting teeth being received within the spaces between the teeth of said member to be checked;

means for rotating said first plurality of partial teeth about said vertical axis to a second position such that said first and second plurality of interfitting partial teeth may be separated from one another along their pitch circle until each contacts the edge of an adjacent tooth of the member to be checked; and means for measuring the amount of rotational movement between said first and second positions.

2. The checking fixture of claim 1, wherein said means for rotating comprises a cylindrical base member having a top surface, a bottom surface, and a third bore coaxial with said vertical axis extending from said top surface to a depth between said top surface and said bottom surface;

said third bore coaxially receiving an annular indexing plate which is rotatable within said third bore;

said first cylindrical member being concentrically attached to said annular indexing plate whereby said annular indexing plate rotates said first cylindrical member between said first and second positions.

3. The checking fixture of claim 1, further comprising a third cylindrical member having a top surface which is axially adjustable relative to the axial position of said partial teeth, said top surface of said third cylindrical member supporting said member to be checked at an adjustable position along the axial length of said partial teeth to compensate for wear on said partial teeth.

4. A checking fixture for use in checking the tooth spacing along the pitch circle diameter of a splined or gear-like member having interior teeth, comprising:

a first cylindrical member having a vertical axis, a top surface, a bottom surface, a peripheral side surface, and a bore extending between said top and bottom surfaces, and a first plurality of partial teeth extending radially outwardly from said side surface;

a second cylindrical member having a top surface, a bottom surface, a peripheral side surface, a coaxial bore extending between said top and bottom surfaces, and a second plurality of partial teeth extending radially outwardly from said side surface;

each of said partial teeth being generally L-shaped when viewed in a direction which is radial relative to said vertical axis; and each of said partial teeth of said first plurality of partial teeth being the complement of one of said partial teeth of said second plurality of partial teeth, in a first position of said first and second cylindrical members said complementary partial teeth interfitting in nested inverted pairs to form substantially continuous uniform teeth, whereby a toothed member to be checked is positionable over said interfitting partial teeth, with said interfitting teeth being received within the spaces between the teeth of said member to be checked;

means for rotating said first plurality of partial teeth about said vertical axis to a second position such that said first and second plurality of interfitting partial teeth may be separated from one another along their pitch circle until each contacts the edge of an adjacent tooth of the member to be checked; and means for measuring the amount of rotational movement between said first and second positions.

5. The checking fixture of claim 4 further comprising a vertical shaft extending coaxially into said bores of said first and second members, said first cylindrical member being concentrically attached to said vertical shaft;

an annular disc having a top surface, a bottom surface and a coaxial bore extending from said top surface to said bottom surface for receiving said shaft, said disc being affixed to said shaft for rotating said shaft and said first cylindrical member from said first position to said second position.

6. The checking fixture of claim 4, further comprising an axially adjustable third cylindrical member having a top surface, a bottom surface and a bore extending from said top to said bottom surfaces;

said third cylindrical member concentrically encircling one of said first and second members; said top surface of said third cylindrical member being axially adjustable relative to the axial position of said partial teeth, said top surface supporting said member to be checked at an adjustable position along the length of said partial teeth to compensate for wear on said partial teeth.

7. A checking fixture for use in checking the tooth spacing along the pitch circle diameter of a splined or similar gear-like member having internal or external teeth comprising:

first and second cylindrical members each having a plurality of partial teeth, the partial teeth of said first and second members being arranged to cooperate with each other to form interfitted complementary paris of complete but segmented teeth which complete but segmented teeth are adapted to fit within the space between the teeth of the member being checked;

means for angularly indexing one of said first and second members relative to the other about an axis corresponding with the center of said pitch circle, to thereby increase the effective width of each interfitted segmented tooth as measured along said pitch circle;

said partial teeth being substantially longer, as measured along an axis parallel to the axis of the member being checked, than the thickness of the member being checked, as measured along the same axis; and an adjustable test member support means for axially positioning and supporting the member being checked at any desired position along the axial length of said partial teeth, whereby as said partial teeth wear from frequent use the portion thereof being engaged by a member being checked can be moved along said axial length of said partial teeth to utilize an unworn portion.

* * * * *